United States Patent
Lang et al.

(10) Patent No.: US 9,573,549 B2
(45) Date of Patent: Feb. 21, 2017

(54) INFLATOR DEVICE WITH INTEGRAL CLAMP STOP

(71) Applicants: Shawn M. Lang, Ogden, UT (US); Kenneth Clark, Morgan, UT (US); Jason Matthew Carter, Harrisville, UT (US)

(72) Inventors: Shawn M. Lang, Ogden, UT (US); Kenneth Clark, Morgan, UT (US); Jason Matthew Carter, Harrisville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 14/755,192

(22) Filed: Jun. 30, 2015

(65) Prior Publication Data

US 2017/0001595 A1  Jan. 5, 2017

(51) Int. Cl.
| | |
|---|---|
| *B60R 21/217* | (2011.01) |
| *B60R 21/26* | (2011.01) |
| *B60R 21/272* | (2006.01) |
| *F17C 1/04* | (2006.01) |
| *F17C 1/06* | (2006.01) |
| *B60R 21/264* | (2006.01) |

(52) U.S. Cl.
CPC ......... *B60R 21/2171* (2013.01); *B60R 21/264* (2013.01); *B60R 21/272* (2013.01); *F17C 1/04* (2013.01); *F17C 1/06* (2013.01); *B60R 2021/26076* (2013.01); *B60R 2021/26082* (2013.01)

(58) Field of Classification Search
CPC ........... B60R 2021/26076; B60R 2021/26082; B60R 2021/26088; B60R 21/201; B60R 21/272;B60R 21/2171; F17C 1/04; F17C 1/06

See application file for complete search history.

(56) References Cited

U.S. PATENT DOCUMENTS

| | | | | | |
|---|---|---|---|---|---|
| 3,843,010 | A | * | 10/1974 | Morse | F17C 1/06 138/30 |
| 3,874,544 | A | * | 4/1975 | Harmon | F17C 1/16 138/140 |
| 3,895,821 | A | * | 7/1975 | Schotthoefer | B60R 21/272 222/5 |
| 3,969,812 | A | * | 7/1976 | Beck | B21D 51/24 220/590 |
| 4,835,975 | A | * | 6/1989 | Windecker | F17C 1/14 220/560.05 |
| 5,028,070 | A | * | 7/1991 | Bender | B60R 21/2644 280/741 |
| 5,152,549 | A | | 10/1992 | Aird | |

(Continued)

FOREIGN PATENT DOCUMENTS

EP        1510418 A1 *  3/2005  ............. B60R 21/26

*Primary Examiner* — Laura Freedman
(74) *Attorney, Agent, or Firm* — Pauley Erickson & Kottis

(57) ABSTRACT

A vehicular safety restraint inflator device, the inflator device includes a tubular housing to provide inflation gas to inflate an associated inflatable restraint device and a toroidal clamp stop positioned on the tubular inflator housing. The clamp stop serves to provide a hard stop for an inflator attachment clamp to secure the inflator device within an airbag module and thus to minimize or avoid undesired lateral movement of the inflator device within a module assembly.

18 Claims, 3 Drawing Sheets

(56) References Cited

U.S. PATENT DOCUMENTS

| | | | |
|---|---|---|---|
| 5,211,306 A * | 5/1993 | Delonge-Immik | B60R 21/268 220/588 |
| 5,301,978 A * | 4/1994 | Munzel | B60R 21/268 280/737 |
| 5,405,164 A | 4/1995 | Paxton et al. | |
| 5,425,548 A | 6/1995 | Rasmussen | |
| 5,492,364 A * | 2/1996 | Anderson | B60R 21/2644 220/589 |
| 5,547,533 A * | 8/1996 | Berglund | B29C 65/5042 156/158 |
| 5,613,704 A | 3/1997 | White, Jr. et al. | |
| 6,224,089 B1 * | 5/2001 | Uchiyama | B60R 21/23 280/728.2 |
| 6,568,703 B2 * | 5/2003 | Hesse | B60R 21/2171 280/728.2 |
| 6,854,764 B2 * | 2/2005 | Larsen | B60R 21/2646 280/741 |
| 6,860,506 B2 * | 3/2005 | Ogata | B60R 21/232 280/728.2 |
| 7,140,639 B2 * | 11/2006 | Hayashi | B60R 21/2171 280/742 |
| 7,147,124 B2 * | 12/2006 | Minta | F17C 1/002 114/74 A |
| 7,677,595 B2 * | 3/2010 | Dominissini | B60R 21/217 248/200 |
| 7,976,062 B2 | 7/2011 | Fechner et al. | |
| 8,007,000 B2 | 8/2011 | Gammill et al. | |
| 8,297,653 B2 * | 10/2012 | Smith | B60R 21/261 280/741 |
| 8,505,963 B1 | 8/2013 | Lewis et al. | |
| 8,979,121 B2 | 3/2015 | Smith et al. | |
| 9,186,855 B2 * | 11/2015 | Hatta | F17C 1/06 |
| 2004/0046375 A1 | 3/2004 | Lincoln et al. | |
| 2004/0150202 A1 * | 8/2004 | Goto | B60R 21/261 280/740 |
| 2005/0225058 A1 * | 10/2005 | Braun | B60R 21/2171 280/728.2 |
| 2006/0060325 A1 * | 3/2006 | Gordon | C22C 47/064 164/98 |
| 2007/0125488 A1 * | 6/2007 | Brisson | B29C 53/665 156/184 |
| 2009/0095796 A1 * | 4/2009 | Prakash | F17C 1/06 228/184 |
| 2010/0181746 A1 | 7/2010 | Rose et al. | |
| 2012/0234839 A1 * | 9/2012 | Smith | B65H 81/02 220/581 |

* cited by examiner

INFLATOR DEVICE WITH INTEGRAL CLAMP STOP

BACKGROUND OF THE INVENTION

Field of the Invention

This invention relates generally to inflator devices such as used in motor vehicle occupant safety restraint systems and, more particularly, to inflator devices having or formed to contain an integral clamp stop.

Discussion of Related Art

It is well known to protect a vehicle occupant by means of safety restraint systems which self-actuate from an undeployed or static state to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision.

Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags also operate to protect other or particular various parts of the body from collision.

In addition to one or more airbag cushions, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion.

Various types or forms of such passive restraint assemblies have been developed or tailored to provide desired vehicle occupant protection based on either or both the position or placement of the occupant within the vehicle and the direction or nature of the vehicle collision. Automotive passenger side airbag installations generally incorporate an airbag module assembly having an inflator device within a module housing or canister and an inflatable airbag cushion adapted to inflate out a side of the module housing. In one currently used passenger side airbag module assembly configuration the inflatable airbag cushion is adapted to inflate out a top side of the module canister, often referred to as a "top mounted" airbag cushion. Such a module assembly is installed in the dashboard of the automobile close to the windshield. Upon activation, the inflator device releases inflation gas which inflates the airbag cushion. The top mounted airbag cushion initially inflates toward the windshield and then rapidly rolls down the dashboard in a direction toward the passenger.

Various types or forms of inflator devices have been disclosed in the art for use in inflating an inflatable restraint system airbag cushion. One such inflator device, generally known as a hybrid airbag inflator, uses high temperature reaction products, typically also including additional gas products, generated by the reaction of a reactive material, to increase the gas pressure within the inflator, rupturing a rupturable seal and inflating one or more airbag cushions. In some cases, the stored and pressurized gas may include or form an oxidizing gas to assist in more fully converting the reaction products generated by the reaction of the reactive material, to compounds such as carbon dioxide and water.

Hybrid inflators are commonly composed of a tubular hybrid inflator housing containing a supply of reactive material and a supply of pressurized gas supplying material. In practice, such tubular inflator housing have an elongated tubular form and are connected or secured in an associated module housing via one or more retainer devices or features. For example, commonly-assigned U.S. Pat. No. 5,405,164 to Paxton et al. discloses hybrid inflator retention in an automotive airbag module using a diffuser sheet fastened to a reaction canister that encloses the hybrid inflator. Commonly assigned U.S. Patent Application Publication 2010/0181746 to Rose et al. discloses the use of a retainer clamp in securing a tubular inflator within an airbag module housing. Commonly assigned U.S. Pat. No. 8,505,963 to Lewis et al. discloses airbag module assemblies having a strap and clamp system to securely hold an inflator relative to a housing.

The size, shape, and components of airbag inflators can vary depending on the vehicle and where in the vehicle the airbag inflator is used, e.g., driver side or passenger side. In addition, the size of the reactive material load contained within such an inflator structure is generally predetermined in order to be sufficient to result in desired inflation of the associated airbag cushion upon actuation of the inflator. As will be appreciated, the incorporation and use of a different sized inflator are often necessary to change or alter the inflation performance provided by the inflator system.

At least in part as a consequence of the significant design changes that may be required to permit the incorporation and use of inflator devices between applications requiring or desiring different inflation performances, module assemblies that utilize attachment or retention clamps for retention of tubular inflator housings within modules have been proposed. Unfortunately, the use of relatively costly high-clamp-force retention clamps and/or multiple retention clamps are typically required to effect required module inflator retention. Moreover, in view of the high levels of pressure and stress exerted on or in such a module assembly upon or during inflator actuation and airbag deployment, there is a need and a demand for improved means and techniques for securing an inflator housing within an associated module housing such as to minimize and preferably avoid undesired movement of the inflator device within the associated module while not unnecessarily complicating production and assembly.

SUMMARY OF THE INVENTION

A general object of the invention is to provide at least one of:

1. an improved vehicular safety restraint inflator device and 2. an improved hybrid inflator device that upon actuation provides a supply of inflation gas to inflate an associated inflatable restraint device.

A more specific objective of the invention is to overcome one or more of the problems described above.

In one aspect of the invention, there is provided a vehicular safety restraint inflator device that includes a tubular housing to provide inflation gas to inflate an associated inflatable restraint device and a toroidal clamp stop positioned on the tubular inflator housing to provide a hard stop for an inflator attachment clamp to secure the inflator device within an airbag module.

In another aspect of the invention, there is provided a hybrid inflator device that upon actuation provides a supply of inflation gas to inflate an associated inflatable restraint device. In one embodiment, such an inflator device includes a tubular hybrid inflator housing containing a supply of reactive material and a supply of pressurized gas supplying material. The inflator device further includes an overwrap about at least a portion of the tubular hybrid inflator housing to form a hybrid inflator device that withstands the pressure generated within the tubular hybrid inflator housing upon reaction of the reactive material. The overwrap can be a composite of fibers and a resin matrix system. The overwrap forms a toroidal clamp stop disposed around tubular hybrid inflator housing to provide a hard stop for an inflator attachment clamp to secure the inflator device within an airbag module.

As described in greater detail below, through such inclusion of a clamp stop in or with an inflator device desirably can serve as a hard stop against the lateral movement of a circular attachment clamp such as used to secure such a tubular inflator device within a module housing.

In another aspect of the invention, there is provided an improvement in an inflator device that upon actuation provides a supply of inflation gas to inflate an associated inflatable restraint device. More particularly, the inflator device has or includes a tubular inflator housing that contains a supply of reactive material. The inflator device further has or includes an overwrap comprising a composite of fibers and a resin matrix system disposed over at least a portion of the inflator housing. In accordance with one embodiment, the improvement involves a clamp stop disposed around an exterior of the tubular inflator housing. The clamp stop desirably provides or serves as a hard stop for an inflator attachment clamp to secure the inflator device within an airbag module.

As used herein, references to an inflator device or housing as being or having a tubular and, more particularly, an elongated tubular form are to be understood to refer to inflator devices or housings having a length to diameter ratio of at least 1:1, preferably no more than 25:1.

Other objects and advantages will be apparent to those skilled in the art from the following detailed description taken in conjunction with the appended claims and drawings.

DETAILED DESCRIPTION OF THE INVENTION

Figure 1:
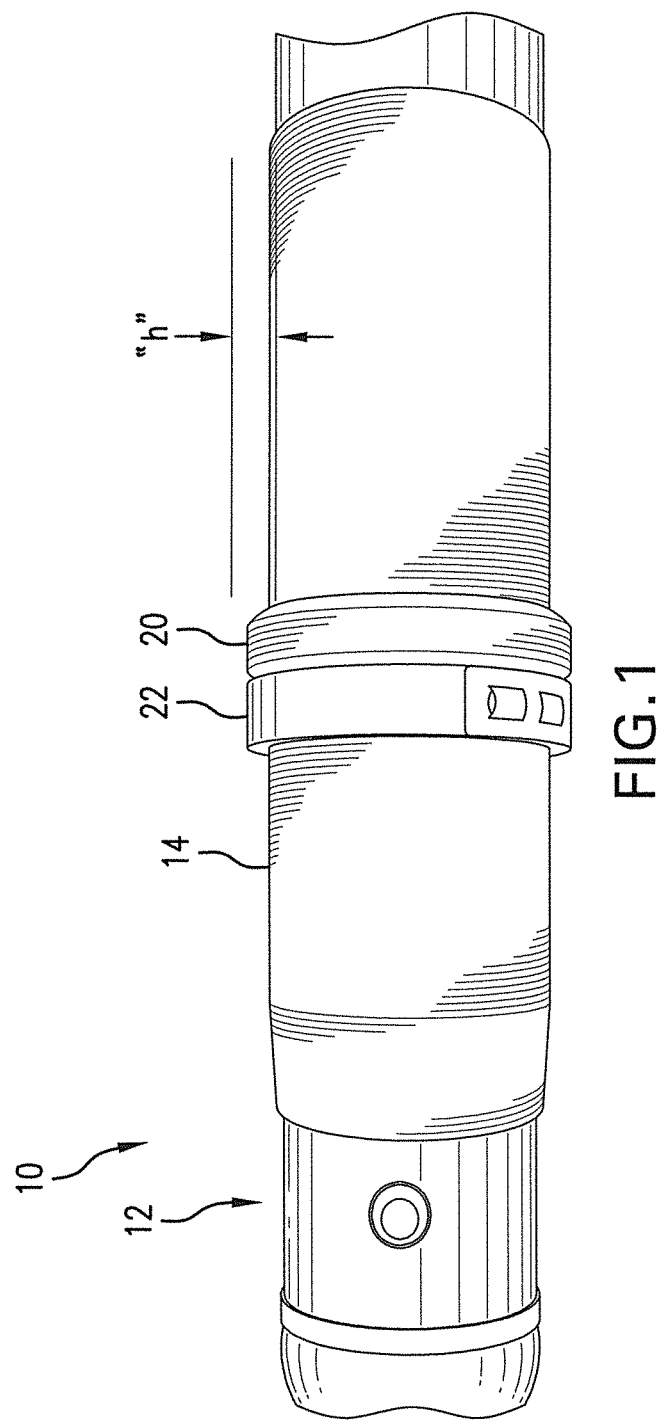
FIG. 1 is a fragmentary perspective view showing a vehicular safety restraint inflator device in accordance with an embodiment of the invention.

FIG. 1 illustrates a vehicular safety restraint inflator device, generally designated with the reference numeral 10, and in accordance with a one embodiment of the invention. While the invention will be described hereinafter with particular reference to passenger side inflator devices and associated airbag inflatable restraint system installations, it will be understood that the invention has general applicability to other types or kinds of airbag assemblies including, for example, single stage passenger, single or dual stage driver side or side airbag assemblies such as for automotive vehicles including vans, pick-up trucks, and particularly automobiles.

The inflator device 10 has a generally cylindrical external outline and includes a generally cylindrical housing 12, such as having a tubular elongated form. The housing 12 desirably may be formed or made of metal or steel or other materials as may be desired for particular applications.

The housing 12 can provide inflation gas to inflate an associated inflatable restraint device, e.g., airbag cushion, such as in a manner know in the art. In the case of a common type of hybrid inflator, inflation gas provided by the housing may, for example, take the form of stored pressurized gas such as may be heated or otherwise appropriately expanded via contact with reaction products from a reactive material also contained, included or a part of the inflator device. Such reaction products in accordance with embodiments of the invention may, for example, include: gas at least in part formed by or from the reactive material, heat produced by the reaction of the reactive material and combinations of such gas and heat.

The inflator device 10 further includes a composite material, such as composed of high strength fibers and a resin matrix system to form an overwrap thickness 14 around, about and/or over at least selected desired portion or portions of the housing 12.

As will be appreciated by those skilled in the art and guided the teachings herein provided, through the inclusion of an overwrap of such composite material, the housing 12 can desirably be fabricated or formed of metal, such as drawn steel or aluminum, for example, wherein the metal is relatively thin as compared to conventional inflator housings without such an overwrap. For example, whereas conventional inflator metal housings are commonly 1.5 to 3 mm thick, the invention permits the utilization of metal housing members having a thickness of less than 1.5 mm preferably less than 1 mm thick.

A high pressure capable structure is created or formed by overwrapping the inflator housing 12 with a selected material such as having the form of a composite.

The overwrap process can generally involve installing or placing the inflator housing 12 in a filament winding machine and subsequently filament winding a composite material, such as composed of high strength fibers and a resin matrix system, around, about and/or over the housing 12 to form the desired overwrap thickness 14 about the housing 12.

Various fiber materials such as known in the art can be used. For improved economics, in certain embodiment the use of glass fiber or basalt fiber materials may be preferred.

The composite overwrapped inflator housing assembly can then be treated, such as by curing (e.g., UV or thermal curing) or melt processing of thermal plastic resins, for example, to form an inflator assembly that withstands the pressure generated within the inflator device upon actuation such as upon reaction of reactive material therein contained but wherein the inflator housing is itself incapable of withstanding the pressure generated within the housing upon reaction of reactive material therein contained without support provided by the composite overwrap.

In accordance with one aspect of the invention, processing times can desirably be reduced or minimized by utilizing a UV cure resin system instead of common thermoset, elevated temperature cure resin systems. For example, a typical elevated temperature cure cycle involves heating at 120° C. for 90 minutes, while a UV cure system can effect cure in under 15 seconds when using an optically transparent fiber such as E-glass. UV curing has the additional safety advantage of avoiding subjecting the reactive material to elevated temperature such as could result in inadvertent actuation or other undesirable degradation of energetic materials, such as included or associated with an initiator, a pyrotechnic gas generant material, for example.

The inflator device 10 includes a clamp stop 20 positioned on the tubular inflator housing 12. The clamp stop 20 acts, serves or otherwise provides a hard stop for an inflator attachment clamp (such as a circular or ring-type clamp shown as item 22) such as to appropriately secure the inflator device 10 in position or place such as within an associated an airbag module.

As will be appreciated by those skilled in the art and guided by the teachings herein provided, such circular or ring-type clamps can desirably secure an associated inflator device within a module in a manner conducive to adaptation to different sized inflator devices in a relatively simple and expedient manner.

The clamp stop 20 as shown in the illustrated embodiment can take the form of a raised feature such as to provide or form a hard stop for the attachment clamp 22. In accordance with one aspect of the invention, the clamp stop is desirably formed or created as an integral component of the inflator device. Further, the clamp stop desirably can serve to minimize and preferably avoid or prevent lateral movement or sliding of the inflator device such as, upon actuation of the inflator device and the occurrence of a deployment event, could otherwise lead to displacement or sliding of the inflator device from the hold or retention provided by the attachment clamp.

The incorporation and use of such a clamp stop can desirably reduce or minimize either or both the number of clamps required or used in a particular application and the clamp force provided or resulting from the used clamp or clamps. For example, in accordance with one aspect of the invention, the use of a single clamp of the above-identified circular or ring-type clamp is effective to realize desired inflation device retention without significant inflator device lateral movement upon inflator device actuation and deployment. It is to be understood, however, that if desired, the invention could be employed in assemblies that include two, three or more attachment clamps. Further, in assemblies with two or more attachment clamps, not each attachment clamp need have an associated clamp stop in accordance with the invention in order to obtain or realize at least a portion or some of one or more of the benefits realizable through the practice of the invention.

The clamp stop 20 comprises or is formed by or as a raised, build-up of the composite onto the inflator housing 12. The shape of the clamp stop 20, e.g., the cross sectional profile of the raised feature, can be but is not restricted to, round or square. Further, such raised feature can be situated or placed at any desired or suitable location on the inflator housing 12 and can be of any desired or suitable relative height. In accordance with one aspect of the invention, such a raised feature can desirably be of a height of from 1 mm to 2.5 mm, where the height (h) is shown in FIG. 1.

While the invention has been described above making reference to an embodiment wherein the clamp stop comprises or is formed by or as a raised, build-up of the composite onto the inflator housing, those skilled in the art and guided by the teachings herein provide will understand and appreciate that the broader practice of the invention is not necessarily so limited. For example, if desired, a clamp stop can be at least in part formed or provided via the inclusion of an added element or component to the inflator assembly.

Figure 2:
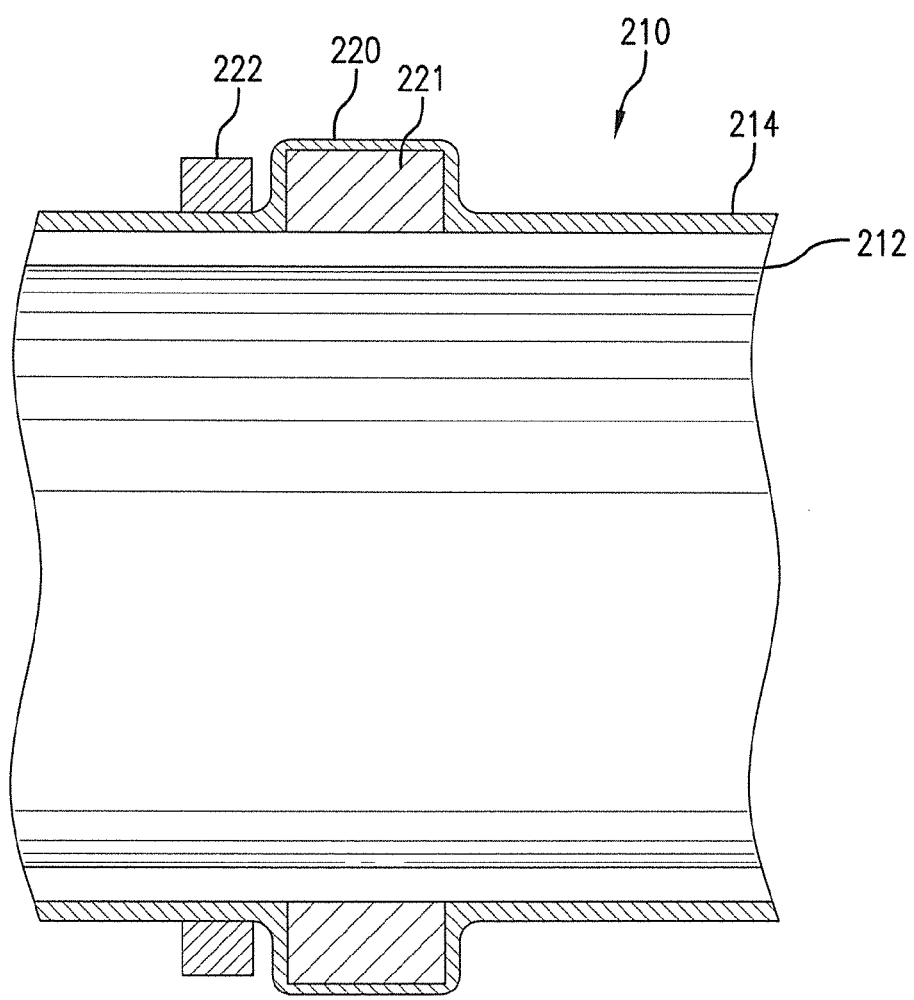
FIG. 2 is a fragmentary side view showing a vehicular safety restraint inflator device in accordance with an embodiment of the invention.

For example, FIG. 2 illustrates a vehicular safety restraint inflator device, generally designated with the reference numeral 210, and in accordance with another embodiment of the invention.

The inflator device 210, similar to the inflator device 10 described above, has a generally cylindrical external outline and includes a generally cylindrical housing 212, such as having a tubular elongated form. The housing 212 desirably may be formed or made of metal or steel or other materials as may be desired for particular applications.

The inflator device 210, further similar to the inflator device 10 described above, further includes a composite material, such as composed of high strength fibers and a resin matrix system to form an overwrap thickness 214 around, about and/or over at least selected desired portions of the housing 212.

The inflator device 210, also similar to the inflator device 10 described above, includes a clamp stop 220 positioned on the tubular inflator housing 212. The clamp stop 220 acts, serves or otherwise provides a hard stop for an inflator attachment clamp (such as a circular or ring-type clamp shown as item 222) such as to appropriately secure the inflator device 210 in position or place such as within an associated an airbag module.

The inflator device 210 at least in part differs from the inflator device 10 in that the clamp stop 220 is at least in part formed by or includes a toroidal-shaped element 221 disposed on the tubular inflator housing 212 with the composite overwrap 214 disposed thereover. The element 221 can be formed of or from various suitable materials including metals, plastics, ceramics and the like and the broader practice of the invention is not necessarily limited by or to the use of specific materials of construction.

Figure 3:
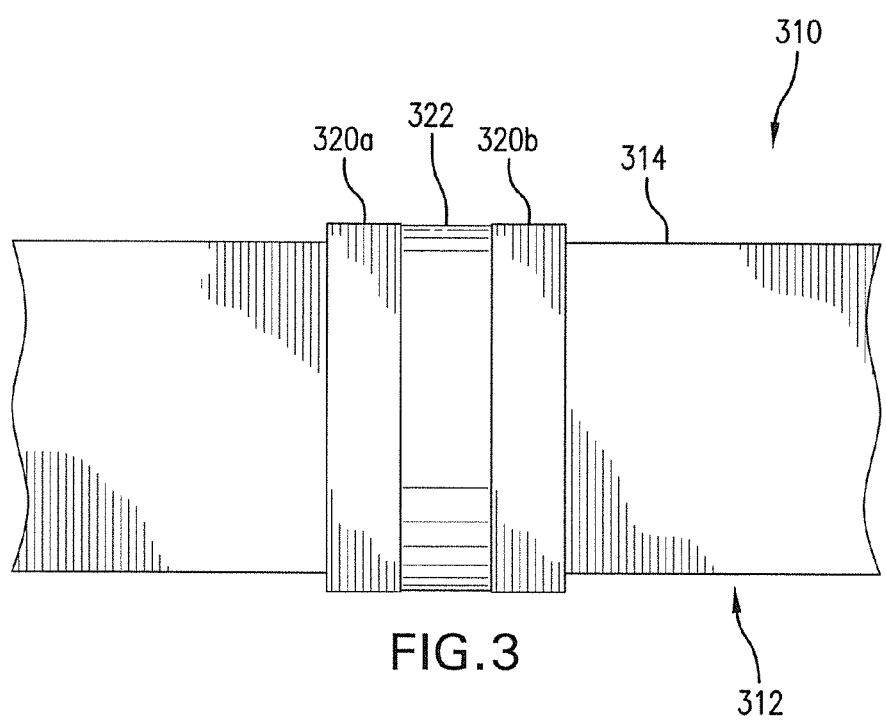
FIG. 3 is a fragmentary cross sectional view showing a vehicular safety restraint inflator device in accordance with an embodiment of the invention.

While the invention has been described above making references to embodiments incorporating a single clamp stop for use in conjunction with an associated clamp, the broader practice of the invention is not necessarily so limited. To that end, FIG. 3 illustrates an alternative embodiment wherein multiple clamp stops are used in conjunction with an attachment clamp. More specifically, FIG. 3 illustrates a vehicular safety restraint inflator device, generally designated with the reference numeral 310.

The inflator device 310, similar to the inflator device 10 described above, has a generally cylindrical external outline and includes a generally cylindrical housing 312, such as having a tubular elongated form. The housing 312 desirably may be formed or made of metal or steel or other materials as may be desired for particular applications.

The inflator device 310, further similar to the inflator device 10 described above, further includes a composite material, such as composed of high strength fibers and a resin matrix system to form an overwrap thickness 314 around, about and/or over at least selected desired portion or portions of the housing 312.

The inflator device 310 at least in part differs from the inflator device 10 in that the inflator device 310 includes first and second clamp stops 320a and 320b positioned on or about the tubular inflator housing 312. The clamp stops 320a and 320b act, serve or otherwise provide a hard stop on opposed sides of an inflator attachment clamp (such as a circular or ring-type clamp shown as item 322) such as to appropriately secure the inflator device 310 in position or place such as within an associated an airbag module.

The invention desirably provides systems or assemblies that provide increased or improved inflator device retention such as by reducing, minimizing or, preferably, avoiding lateral movement or sliding of inflator devices upon actuation and deployment.

The invention desirably reduces system level costs such as by either or both: 1) facilitating the incorporation and use of lower cost inflator attachment features or elements, e.g., clamps, and 2) reducing or minimizing the number of inflator attachment features or elements, e.g., clamps, required to effect desired inflator attachment and retention.

The invention desirably reduces costs associated with either or both assembly and production such as by facilitating the incorporate and use of circular or ring-type inflator attachment clamps.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A vehicular safety restraint inflator device, the inflator device comprising:
    a tubular housing to provide inflation gas to inflate an associated inflatable restraint device; and
    a toroidal clamp stop positioned on the tubular housing to provide a hard stop for an inflator attachment clamp to secure the inflator device within an airbag module;
    wherein a reactive material is contained within the tubular housing and reaction of the reactive material within the tubular housing generates an increase in pressure within the tubular housing, the inflator device additionally comprising:
    an overwrap about at least a portion of the tubular housing to form an inflator assembly that withstands the pressure generated within the tubular housing upon reaction of the reactive material, the overwrap comprising a composite of fibers and a resin matrix system and
    wherein the toroidal clamp stop comprises a toroidal-shaped element disposed on the tubular housing with the composite overwrap disposed thereover.

2. The vehicular safety restraint inflator device of claim 1 wherein the inflator device comprises a hybrid inflator.

3. The vehicular safety restraint inflator device of claim 1 wherein the tubular housing is incapable of withstanding the pressure generated within the tubular housing upon reaction of the reactive material without support provided by the overwrap.

4. The vehicular safety restraint inflator device of claim 1 wherein the tubular housing has a length to diameter ratio of at least 1:1.

5. A vehicular safety restraint inflator device, the inflator device comprising:
    a tubular housing to provide inflation gas to inflate an associated inflatable restraint device; and
    a toroidal clamp stop positioned on the tubular housing to provide a hard stop for an inflator attachment clamp to secure the inflator device within an airbag module;
    wherein a reactive material is contained within the tubular housing and reaction of the reactive material within the tubular housing generates an increase in pressure within the tubular housing, the inflator device additionally comprising:
    an overwrap about at least a portion of the tubular housing to form an inflator assembly that withstands the pressure generated within the tubular housing upon reaction of the reactive material, the overwrap comprising a composite of fibers and a resin matrix system and
    wherein the toroidal clamp stop comprises a raised build-up of the composite onto the tubular housing.

6. The vehicular safety restraint inflator device of claim 5 wherein the inflator device comprises a hybrid inflator.

7. The vehicular safety restraint inflator device of claim 5 wherein the tubular housing is incapable of withstanding the pressure generated within the tubular housing upon reaction of the reactive material without support provided by the overwrap.

8. The vehicular safety restraint inflator device of claim 5 wherein the tubular housing has a length to diameter ratio of at least 1:1.

9. A hybrid inflator device that upon actuation provides a supply of inflation gas to inflate an associated inflatable restraint device, the inflator device comprising:
    a tubular hybrid inflator housing containing a supply of reactive material and a supply of pressurized gas supplying material; and
    an overwrap about at least a portion of the tubular hybrid inflator housing to form a hybrid inflator device that withstands pressure generated within the tubular hybrid inflator housing upon reaction of the reactive material, the overwrap comprising a composite of fibers and a resin matrix system, the overwrap forming a toroidal clamp stop disposed around the tubular hybrid inflator housing to provide a hard stop for an inflator attachment clamp to secure the inflator device within an airbag module.

10. The vehicular safety restraint inflator device of claim 9 wherein the tubular hybrid inflator housing is incapable of withstanding the pressure generated within the tubular hybrid inflator housing upon reaction of the reactive material without support provided by the overwrap.

11. The vehicular safety restraint inflator device of claim 9 wherein the toroidal clamp stop comprises a raised build-up of the composite onto the tubular hybrid inflator housing.

12. The vehicular safety restraint inflator device of claim 9 wherein the tubular hybrid inflator housing has a length to diameter ratio of at least 1:1.

13. In an inflator device that upon actuation provides a supply of inflation gas to inflate an associated inflatable restraint device, the inflator device including a tubular inflator housing containing a supply of reactive material, the inflator device having an overwrap comprising a composite of fibers and a resin matrix system disposed over at least a portion of the inflator housing, the improvement comprising:
    a clamp stop disposed around an exterior of the tubular inflator housing, the clamp stop providing a hard stop for an inflator attachment clamp to secure the inflator device within an airbag module,
    wherein the clamp stop comprises a toroidal-shaped element and
    wherein the overwrap extends over the toroidal-shaped element.

14. The improvement of claim 13 wherein the inflator device comprises a hybrid inflator.

15. The improvement of claim 13 wherein the inflator device comprises an elongated tubular form.

16. In an inflator device that upon actuation provides a supply of inflation gas to inflate an associated inflatable restraint device, the inflator device including a tubular inflator housing containing a supply of reactive material, the inflator device having an overwrap comprising a composite of fibers and a resin matrix system disposed over at least a portion of the inflator housing, the improvement comprising:

a clamp stop disposed around an exterior of the tubular inflator housing, wherein the clamp stop comprises a toroidal-shaped build-up of the composite onto the tubular inflator housing, the clamp stop providing a hard stop for an inflator attachment clamp to secure the inflator device within an airbag module.

17. The improvement of claim 16 wherein the inflator device comprises a hybrid inflator.

18. The improvement of claim 16 wherein the inflator device comprises an elongated tubular form.

* * * * *